July 9, 1957
A. A. ROOT
2,798,644
SQUEEZE CONTAINER WITH DROP FORMING SPOUT
Filed Nov. 22, 1955
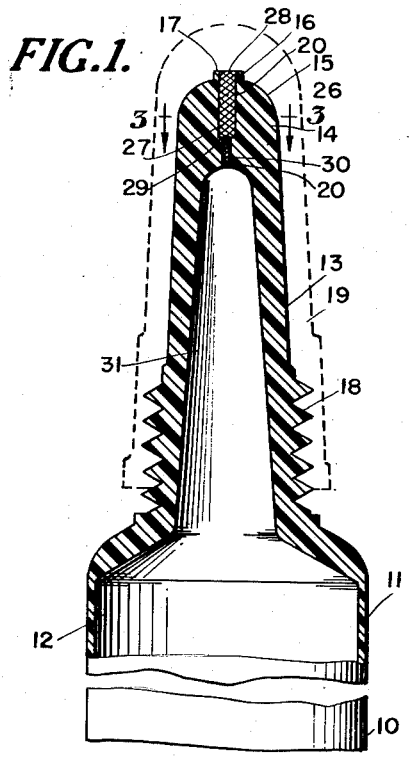
FIG.1.
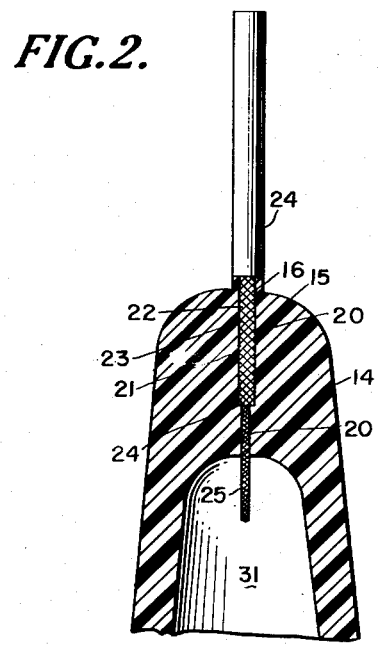
FIG.2.
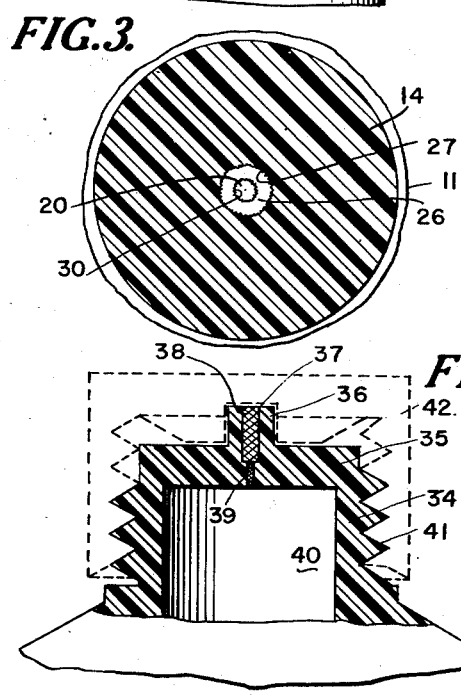
FIG.3.
FIG.5.
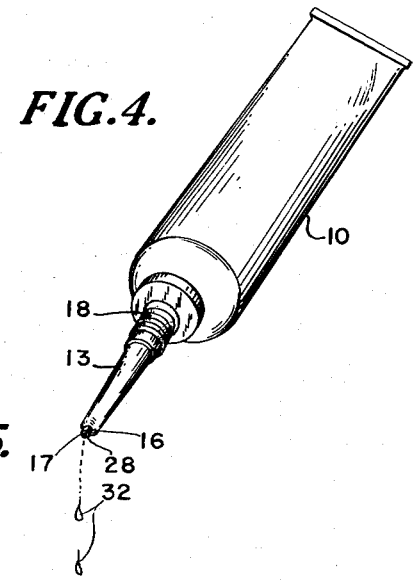
FIG.4.
INVENTOR
ANDREW A. ROOT
BY Cushman, Darby & Cushman
ATTORNEYS United States Patent Office 2,798,644
Patented July 9, 1957

2,798,644

SQUEEZE CONTAINER WITH DROP FORMING SPOUT

Andrew A. Root, Concord, Mass., assignor to Bradley Container Corporation, Maynard, Mass., a corporation of Delaware Application November 22, 1955, Serial No. 548,414

6 Claims. (Cl. 222—215)

The present invention relates to plastic containers and, more particularly, to a squeeze-to-use type plastic container for dispensing liquid in a single drop.

An important object is to provide a simple, efficient, durable and economical plastic container having a hollow, flexible body and a solid head, the solid head being provided with a longitudinally and centrally disposed passage extending from the outer end thereof into the interior of the body for expelling the liquid material therefrom, in measured droplet form, each time the plastic container is squeezed. In order to insure the liquid issuing from the container in single uniform drops, the solid blind head or top is formed by a suitable two-step drill, with a liquid supply passage which communicates the inside of the container with the outside thereof. This passage has an enlarged portion extending inwardly from the outer end of the head a predetermined distance, and which is provided with a roughened inner wall, so as to cause the liquid material to cling thereto until a sufficient amount has accumulated to form a drop. The lower or inner end of the enlarged portion of the liquid passage communicates with the interior of the body through a restricted or relatively small portion or passage spaced from the outer end of the head. Additionally, the outer end of the head has an annular reduced shoulder or protuberance. The end of the shoulder is provided with a smooth flat drop-forming surface which surrounds a discharge orifice at the outer end of the drilled passage.

A further object comprehends the provision of an improved method of forming a one-piece plastic container having a flexible hollow body and a plastic head, which consists in molding a solid thermoplastic head onto a thermoplastic hollow body, drilling a longitudinally and centrally disposed liquid or fluid supply passage through the head, so that the passage has an enlarged portion extending from the outer end of the head a limited distance inwardly. The enlarged portion of the passage communicates with the interior of the body through a constricted portion spaced from the outer end of the head in order to insure the liquid material being dispensed in uniform single drops each time the plastic container is squeezed.

Other objects and advantages of the invention will become apparent from the following description when taken in conjunction with the accompanying claims and drawings.

Referring to the drawings, in which are shown preferred embodiments of the invention:

Figure 1 is a perspective view with parts in section of a one-piece plastic container constructed in accordance with the present invention;

Figure 2 is an enlarged sectional view of the upper end portion of a plastic container showing a two-step drill tool inserted in the solid head of the container for the purpose of forming a discharge passage having a restricted portion and an enlarged portion arranged to insure the liquid being dispensed uniformly in single drops when the container is squeezed;

Figure 3 is an enlarged sectional view taken substantially along the line 3—3 of Figure 1;

Figure 4 is a perspective view of a squeeze-to-use type plastic container made in accordance with the present invention; and Figure 5 is a detailed sectional view of the upper portion of a modified form of the container.

Referring to the drawings, 10 indicates a plastic container formed of any suitable thermoplastic material such as polyethylene or the like, and which is provided with a flexible hollow body 11 having a main cavity or chamber 12 (Figure 1) for receiving the liquid to be dispensed therefrom in the form of single drops. An elongated thermoplastic tubular neck 13 is molded onto the body 11 and is provided with a blind or solid plastic head 14 which may have a curved outer end or top 15. Extending outwardly and centrally from the curved end 15 is a reduced annular shoulder or portion 16 formed with a smooth, flat drop-forming end surface 17. The plastic container 10 may vary in size and shape as the particular use to which it is to be applied may require. The lower portion of the reduced neck 13 may be provided with external threads 18 for receiving complementary internal threads of a removable closure cap 19 as shown in dotted lines in Figure 1.

Heretofore, the heads of containers used for dispensing liquid material in the form of drops have been provided with plastic plugs, metal balls and the like, so as to produce a restriction to control the flow of the material from the container. In order to overcome the deficiencies found to exist in containers of this type as previously made, and to simplify and insure the dispensing of the liquid in uniform single drops each time the container body 11 is squeezed, an elongated discharge passage 20 (Figure 1) is formed in the solid head 14 which extends from the outer end of the neck inwardly so as to communicate with the passage 31 and the chamber 12 of the one-piece container. The passage 20 is formed through the solid head 14 preferably by a special two-step drill tool 21 (Figure 2). The tool 21 has an enlarged cylindrical portion 22 provided with a roughened or serrated outer surface 23 which at its upper end is suitably connected to a handle 24. The roughened portion 23 has a reduced lower or inner shoulder portion 24 to which is connected a depending lower end portion 25 which is not entirely smooth and may be provided with a roughened surface not as pronounced as the roughened surface 23 (Figure 2). The length of the reduced end portion 25 of the tool is such as to extend into the passage 31 in the neck upon completion of the through passage or bore 20 in the head.

Thus, it will be seen that the tool 21 is so shaped that as it is drilled through the solid or blind plastic head 14, it forms the through passage 20 with an enlarged portion 26 (Figure 1) having a roughened or serrated inner wall 27 that extends inwardly a limited or predetermined distance from the discharge orifice or mouth 28 that is enclosed or surrounded by the flat drop-forming surface 17. The inner end of the enlarged portion or passage 26 has a reduced shoulder 29 that communicates with the elongated restricted passage 30 formed by the reduced end portion 25 of the tool. The restricted passage 30 in turn communicates through the passage 31 with the chamber 12 in the flexible body 11.

It has been found that by using a special type of drilling tool, such as 21, the passage 20 is accurately shaped so as to have the elongated restricted portion 30 thereof located adjacent the passage 31 in the neck. Additionally, the enlarged passage 26 coacts with the restricted passage 30 and the flat surface 17 at the discharge orifice 28 in such a manner, as to insure the liquid material being dispensed in single uniform drops, each time the flexible body 11 is squeezed. Thus, the tool 21 provides means for more accurately forming and shaping the passage 20 than could be obtained by forming this passage by molding. The roughened surface 27 in the enlarged passage provides means for preventing the drops from prematurely being dispensed from the flat dispensing head 17 and thus produces drops of substantially uniform size and shape and which are neither too small or too large. The elongated enlarged roughened portion 27 preferably is of such a length as to extend inwardly for at least a major portion of the length of the passage 20.

In operation, assuming that the head or top 14 has been formed with the supply passage 20 having the enlarged portion 26 and a restricted portion 30, the chamber 10 is filled with the liquid material to be dispensed. The mouth 28 may then be closed by the cap 19 which is threaded as at 18 to the lower portion of the neck (Figure 1). When the liquid material is to be dispensed from the container 10, the cap 19 is removed and the flexible body 11 is squeezed so as initially to cause the liquid material to pass through the tubular neck 13 into the restricted passage 30 and then into the enlarged passage 26 (Figure 1) until sufficient liquid is available to form a drop that collects on the flat dispensing head 17 so as to fall therefrom in drops 32 of substantially uniform size and shape. In other words, the roughened surface 27 provides retarding means for insuring the entire flat area of the exposed end surface 17 being wet by the liquid material as it issues from the mouth 28. This liquid material clings or adheres to the flat surface 17 until a sufficient amount of the liquid has collected thereon to form a drop. Without the roughened surface 27 the liquid material might fall prematurely from the dispensing head and produce a drop which is too small. The size of each drop depends on the viscosity of the liquid material, diameter of the orifice 28, area of the flat drop-forming surface 17 and the capacity of the enlarged passage or cavity 26. The flat drop-forming surface 17 coacts with the restricted passage 30 and the enlarged passage 26 to provide means for accurately controlling the dispensing of the liquid in measured or uniform single drops within an accuracy of 10% of a specified number of drops per cc.

The restricted passage or channel 30 is of such length as to coact with the roughened surface 27 in the enlarged passage 26, so that the entire drop-forming surface 17 that surrounds the discharge orifice 28 will be easily wet by the liquid material, thus causing the latter to cling to the surface 17 until a sufficient amount has collected to be formed into a drop. In other words, means are provided for measuring out fluids in droplets of uniform size and for preventing the droplets from prematurely falling from the dispensing head 17 so that very little, if any, of the liquid is wasted.

In the modified form of the invention shown in Figure 5, the plastic container 33 for carrying liquid and other flowable material, is provided with a flexible hollow body similar to the body 11 previously described and is formed with a tubular short neck 34 having a solid upper end portion or head 35 provided centrally with a reduced solid annular extension 36. The head 35 and extension 36 are drilled to form a through passage 37 by any suitable means, such as the tool 21, previously described so as to have an upper elongated roughened portion 38 and a lower restricted portion 39 that communicates with the chamber 40 in the neck 34 which, in turn, is in direct communication with the interior of the hollow body 33. The neck 34 may be externally threaded as at 41 for receiving the complementary formed interior threads of a closure cap 42.

Thus, it will be seen that in both forms of the invention a one-piece plastic container of the squeeze-to-use type is provided with a blind top or head portion in which is drilled a passage having an enlarged portion extending a limited distance inwardly from the outer end thereof and which terminates in a constricted portion that communicates with the hollow body. Additionally, the discharge end or mouth of the dispensing passage is surrounded by a flat, smooth drop-forming surface for insuring the uniform expelling of the liquid material from the container upon squeezing the flexible body thereof. Also, the enlarged roughened surface of the passage in the top or head of each of the necks is of relatively small capacity and communicates with the hollow neck or body through a restricted passage of smaller size or diameter than the roughened passage.

It will be understood that the forms of the invention shown are merely illustrative and that such changes may be made as come within the scope of the following claims.

I claim:

1. The method of forming a one-piece plastic container of the squeeze-to-use type having a flexible hollow body and a reduced neck provided with a closed top, which consists in molding a thermoplastic neck and a blind top to a thermoplastic flexible body of the container, drilling a longitudinally disposed passage through the neck and top so that the passage is provided with an enlarged portion extending from the outer end of the top a limited distance inwardly and is connected to a constricted portion communicating with the hollow body, forming the inner wall of the enlarged portion of the passage with a roughened surface, and forming the outer end of the neck with a flat drop-forming surface surrounding said passage so as to insure the discharge of the liquid in droplet form when the flexible body is squeezed.

2. A plastic container of the squeeze-to-use type including a flexible hollow body for receiving flowable material, said body having a reduced tubular neck, said neck terminating in a solid head, said head having a through passage therein, and the wall of said passage having a roughened surface so as to insure the discharge of the liquid in droplet form when the flexible body is squeezed.

3. A plastic container of the squeeze-to-use type including a flexible hollow body for receiving flowable material, said body having a tubular neck, said neck terminating in a head provided with a reduced outwardly extending shoulder, said shoulder having a flat drop-forming end surface, said head and said shoulder having a through axial passage therein, and the wall of said passage having a roughened surface so as to insure the discharge of the liquid in droplet form when the flexible body is squeezed.

4. A one-piece plastic container of the squeeze-to-use type including a flexible hollow body for receiving flowable material, said body having a tubular neck, said neck terminating in a head provided with a reduced outwardly extending shoulder, said shoulder having a flat drop-forming end surface, said head and said shoulder having a through passage therein, said passage being provided with an upper enlarged portion extending a limited distance inwardly from the outer end of the shoulder and terminating in a lower constricted portion communicating with the hollow body, said upper and lower passages having roughened surfaces so as to insure the discharge of the liquid in droplet form when the flexible body is squeezed.

5. A one-piece plastic container, as called for in claim 4, in which the roughened surface in the lower portion of said passage is not as pronounced as in the upper portion thereof.

6. A one-piece plastic container of the squeeze-to-use type including a flexible hollow body for receiving flowable material, said body having a tubular neck, said neck terminating in a head provided with a reduced outwardly extending shoulder said shoulder having a flat drop-forming end surface, said head and said shoulder having a through passage therein, said passage being provided with an upper enlarged portion extending a limited distance inwardly from the outer end of the shoulder and terminating in a lower constricted portion communicating with the said hollow body, and the upper enlarged portion having a roughened surface for insuring the discharge of the liquid in droplet form when the flexible body is squeezed.

References Cited in the file of this patent

UNITED STATES PATENTS

| | | |
|---|---|---|
| 2,636,215 | Smith | Apr. 28, 1953 |
| 2,663,463 | Benbury et al. | Dec. 22, 1953 |

FOREIGN PATENTS

| | | |
|---|---|---|
| 11,074 | Great Britain | July 16, 1890 |
| 442,264 | Great Britain | Feb. 5, 1936 |